United States Patent [19]

Yamasaki et al.

[11] 4,432,623
[45] Feb. 21, 1984

[54] AUTOMATIC EXPOSURE CONTROL CAMERA

[75] Inventors: Masafumi Yamasaki; Muneaki Yoshida, both of Tokyo, Japan

[73] Assignee: Olympus Optical Co., Ltd., Tokyo, Japan

[21] Appl. No.: 301,231

[22] Filed: Sep. 11, 1981

[30] Foreign Application Priority Data

Sep. 22, 1980 [JP] Japan ............................... 55-132197

[51] Int. Cl.³ .............................................. G03B 7/08
[52] U.S. Cl. .................................................... 354/412
[58] Field of Search ............................................. 354/31

[56] References Cited

U.S. PATENT DOCUMENTS

| | | | |
|---|---|---|---|
| 3,864,699 | 2/1975 | Tsunekawa et al. | 354/31 |
| 4,284,341 | 8/1981 | Yamada | 354/31 |
| 4,322,142 | 3/1982 | Kawamura et al. | 354/31 |
| 4,325,617 | 4/1982 | Sahara et al. | 354/31 |

FOREIGN PATENT DOCUMENTS 48-769 of 0000 Japan .
51-6548 of 0000 Japan .

*Primary Examiner*—Russell E. Adams
*Attorney, Agent, or Firm*—Frishauf, Holtz, Goodman & Woodward

[57] ABSTRACT

Disclosed is a single lens reflex camera of the mean metering type having a first photodiode provided between a mirror and a film and a second photodiode provided in a finder system in which before the shutter release a shutter time is calculated on the basis of an output signal of the second photodiode and is displayed in the finder, and when the shutter release starts and the mirror rises and the shutter time is determined by an output signal from the first photodiode for receiving the reflected light from a front shutter curtain and the film. In the camera, a central portion of the mirror is translucent. A submirror is provided behind the translucent portion, which causes the first photodiode to receive the light from only the central portion of a frame before the shutter release. Further, the camera has a first operating circuit for obtaining a difference between the outputs from the first and second photodiodes before the shutter release and a second operating circuit for adding the result of the operation by the first operating circuit to the output from the first photodiode during the shutter release, whereby a partial metering for controlling a shutter time during the shutter release in accordance with the result of the operation by the second operating circuit is realized.

5 Claims, 20 Drawing Figures

AUTOMATIC EXPOSURE CONTROL CAMERA

BACKGROUND OF THE INVENTION

The present invention relates to an automatic exposure control camera of the aperture priority type.

Recently, in the field of the TTL type camera, there has been developed an automatic exposure control camera of the so-called direct metering type which measures the light of an object coming through a lens into a camera and reflected from a film after the shutter is released thereby to determine a shutter time. The direct metering type camera is advantageous in that since a preset of the shutter time is not required, there is no need of memory elements and therefore the construction of the camera is simple, and that the camera can follow an abrupt change of brightness during the course of shutter release. The camera has the following disadvantages, however. A light receiving range of a photodiode covers an entire viewing screen while a metering characteristic of a metering circuit depends on a center-weighted mean metering in which the metering characteristic is selected placing an emphasis on the central portion of the viewing screen. For photographing an object having extremely light and shade portions, it is preferable to employ a partial metering which meters a limited narrow area in the viewing screen by using a photodiode with a narrow light receiving range. Further, it is advisable that a plurality of portions on the screen, not a single portion, are metered, and a mean value of those metered ones is used to determine a real metering value. For realizing a changeover of the metering range from one to another by the conventional direct metering circuit, a considerably complicated construction is required. Additionally, in the direct metering, it is impossible to calculate the mean value of the partial metered values at the plurality of portions during the shutter operation.

SUMMARY OF THE INVENTION

Accordingly, an object of the present invention is to provide an automatic exposure control camera of the direct metering type which is able to change a metering range.

To achieve the above object, an automatic exposure control camera according to the present invention comprises first and second photoelectric converting elements which are both in a light receiving state before the shutter release but only one of which is in the light receiving state during the shutter release, a first operating circuit coupled with the first and second photoelectric converting elements for producing a difference signal between output signals of the first and second photoelectric converting elements before the shutter release, a second operating circuit for producing a sum signal of an output signal from a photoelectric converting element rendered the light receiving state during the shutter release and an output signal from the first operating circuit and a circuit for controlling an exposure in accordance with one of an output signal from the second operating circuit and an output signal from the photoelectric converting element rendered the ligh receiving state during the shutter release.

DETAILED DESCRIPTION OF THE PREFERRED EMBODIMENT

Figure 1:
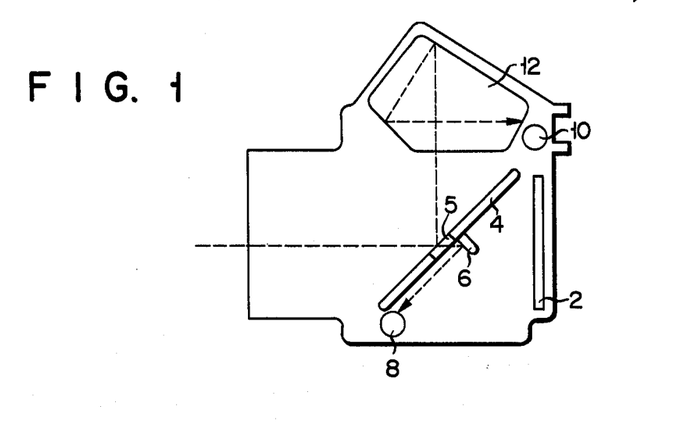
FIG. 1 schematically illustrates an arrangement of photoelectric converting elements in an embodiment of an anutomatic exposure control camera according to the present invention.

An embodiment of an automatic exposure control camera according to the present invention will be described, referring to the accompanying drawings. FIG. 1 illustrates an arrangement of photodiodes. A center of a mirror 4 provided in front of a film 2 is constructed of a halfmirror 5. A submirror 6 is provided behind the halfmirror 5. A first photodiode 8 is provided at the bottom of the camera. A second photodiode 10 is provided at a finder portion. The first and second photodiodes 8 and 10 have the same characteristics and a light receiving range of each of the diodes covers an entire viewing screen. The first photodiode 8 senses the light of an object reflected from the submirror 6 through a halfmirror 5 at the center of the mirror 4 before a shutter is released, when the mirror 4 is descended, as shown in FIG. 1. The diode 8 detects the light of an object reflected from the film 2 during the shutter release. To be more specific, the first photodiode 8 meters only a center of the screen before the shutter release. The second diode 10, before the shutter release, detects a light from an object reflected from the mirror 4 through a penta prism 12, and it cannot sense the light of the object during the shutter release, because the mirror 4 ascends in this case.

Figure 2:
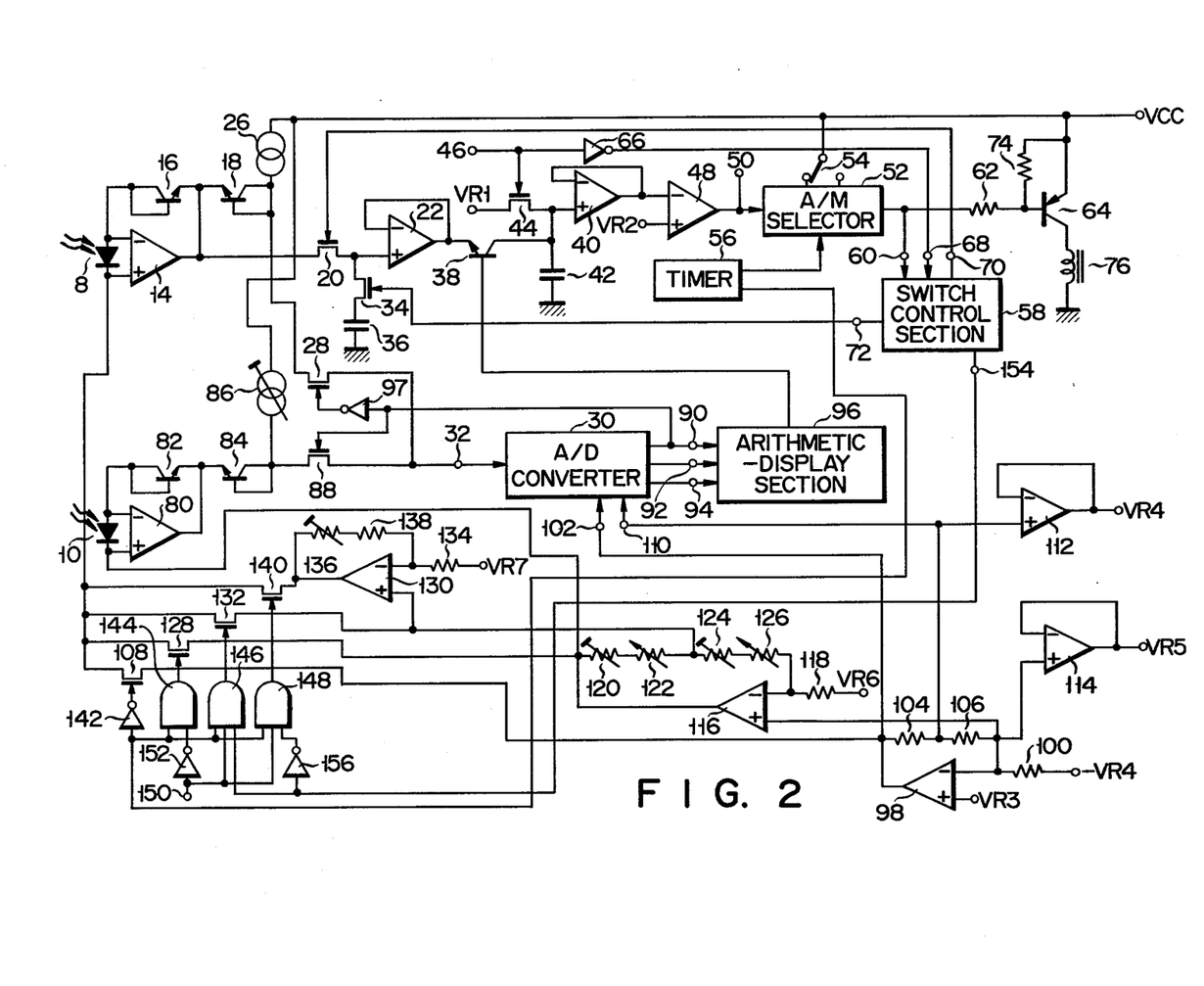
FIG. 2 shows a circuit diagram of the embodiment.

FIG. 2 is a circuit diagram of the present embodiment. An anode and a cathode of the first photodiode 8 are connected to an inverting input terminal and a noninverting input terminal of an operational amplifier 14, respectively. An output terminal of the operational amplifier 14 is connected with emitters of NPN transistors 16 and 18, and is connected with a noninverting input terminal of an operational amplifier 22 through an N channel MOS FET 20 (all the MOS FETs will be of the N channel type) as an analog switch. A base of the transistor 16 is connected with a collector of the transistor 16 and the inverting input terminal of the operational amplifier 14. A base of the transistor 18 is connected with a collector of the transistor 18 and a power source terminal VCC through a constant current source 26. (The power source will be a positive power source except for an exceptional case.) The collector of the transistor 18 is also connected to a first input terminal 32 of an A/D converter 30 through a MOS FET 28. A noninverting input terminal of the operational amplifier 22 is grounded through a series connection of a MOS FET 34 and a capacitor 36. An output terminal of the operational amplifier 22 is coupled with its inverting input terminal, and also it is connected to an emitter of an NPN transistor 38. A collector of the transistor 38 is connected to a noninverting input terminal of an operational amplifier 40 and is grounded through a capacitor 42. A power source terminal VR1 is also connected to the noninverting input terminal of the operational amplifier 40 through a MOS FET 44. A terminal 46 set to a level in accordance with a front shutter curtain running is connected to a gate of the MOS FET 44. The output terminal of the operational amplifier 40 is connected to an inverting input terminal thereof and to an inverting input terminal of an operational amplifier 48. A noninverting input terminal of the operational amplifier 48 is connected to a power source terminal VR2. An output terminal of the operational amplifier 48 is connected to an electronic flash connecting terminal 50, and an auto/manual (A/M) elector 52. A power source terminal VCC is connected through a switch 54 to the auto/manual selector 52. Through the switching operation of the switch 54, the auto or manual exposure is selected. A first output signal from a timer 56 for setting a shutter time in the manual exposure mode is also applied to the auto/manual selector 52. An output terminal of the auto/manual selector 52 is coupled with a first input terminal 60 of a switch control section 58, and to a base of a PNP transistor 64 through a resistor 62. The terminal 46 is connected to a second input terminal 68 of the switch control section 58 through an inverter 66. First and second output terminals 70 and 72 of the switch control section 58 are coupled with gates of the MOS FETs 20 and 34, respectively. An emitter of the transistor 64 is connected to the power source terminal VCC and connected to the base thereof through a resistor 74. A collector of the transistor 64 is connected to an electromagnet 76 for charging a rear shutter curtain.

An anode and a cathode of the second photodiode 10 are connected to inverting and noninverting input terminals of an operational amplifier 80, respectively. An output terminal of the operational amplifier 80 is connected to emitters of NPN type transistors 82 and 84. A base of the transistor 82 is connected with a collector thereof and the inverting input terminal of the operational amplifier 80. A base of the transistor 84 is connected with a collector thereof and the power source terminal VCC through a current source 86 and to the first input terminal 32 of the A/D converter 30 through a MOS FET 88. First to third output signals of the A/D converter 30 are connected through terminals 90, 92 and 94 to an arithmetic-display section 96. The terminal 90 is connected to a gate of the MOS FET 88 and to a gate of the MOS FET 28 through an inverter 97. The output signal of the arithmetic-display section 96 is supplied to a base of the transistor 38.

A power source terminal VR3 is connected to a noninverting input terminal of an operational amplifier 98, and a negative power source terminal −VR4 is connected to an inverting input terminal of the operational amplifier 98 through a resistor 100. An output terminal of the operational amplifier 98 is connected to a second input terminal 102 of the A/D converter 30 and is connected to its inverting input terminal through a series connection of resistors 104 and 106. The output terminal of the operational amplifier 98 is also connected to a cathode of the first photodiode 8 through a MOS FET 108. A junction point between the resistors 104 and 106 is connected to a third input terminal 110 of the A/D converter 30 and a noninverting input terminal of an operational amplifier 112. An output terminal of the operational amplifier 112 is connected to its inverting input terminal and a power source terminal VR4. The inverting input terminal of the operational amplifier 98 is connected to noninverting input terminals of operational amplifiers 114 and 116. An output terminal of the operational amplifier 114 is connected to its inverting input terminal and a power source terminal VR5. A power source terminal VR6 is connected to an inverting input terminal of the operational amplifier 116 through a resistor 118. An output terminal of the operational amplifier 116 is connected to the cathode of the second photodiode 10 and to its inverting input terminal through a series connection of variable resistors 120, 122, 124, and 126. The output terminal of the operational amplifier 116 is connected to the cathode of the first photodiode 8 through a MOS FET 128. The variable resistors 120, 122, 124 and 126 are for display adjustment, aperture information introduction, direct metering exposure adjustment, and film sensitivity information introduction, respectively. A junction point between the variable resistors 124 and 122 is connected to a noninverting input terminal of an operational amplifier 130 and to the cathode of the first photodiode 8 through a MOS FET 132. A power source terminal VR7 is connected to an invertng input terminal of the operational amplifier 130 through a resistor 134. An output terminal of the operational amplifier 130 is connected through a variable resistor 136 and a resistor 138 to its inverting input terminal, and to the cathode of the first photodiode 8 through a MOS FET 140. The variable resistor 136 is provided for correcting a variation in the brightness of the front shutter curtain of each camera. A second output terminal of the timer 56 is connected to an inverter 142, and AND gates 144, 146 and 148. A terminal 150 set to a level in accordance with the state of a release button is connected to the AND gates 146 and 148, and an inverter 152. An output terminal of the inverter 152 is connected to the AND gate 144. A third output terminal 154 of a switch control section 58 is connected to the AND gate 146 and an inverter 156. An output terminal of the inverter 156 is connected to the AND gate 148. Output terminals of the inverter 142, and the AND gates 144, 146 and 148 are respectively connected to gates of the MOS FETs 108, 128, 132 and 140.

Figure 3:
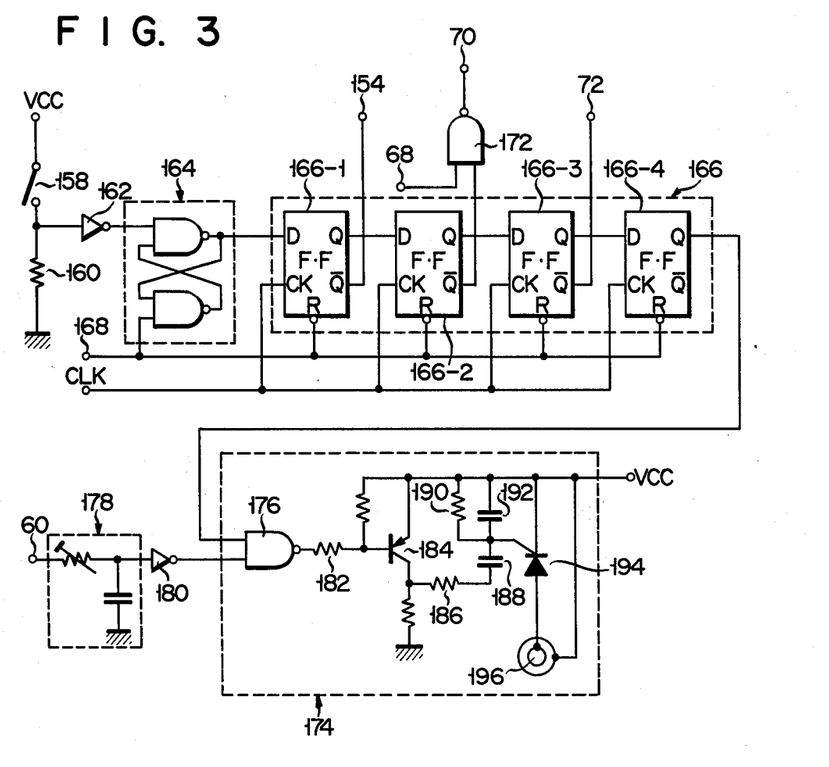
FIG. 3 shows a circuit diagram of a switch control section in the embodiment.

FIG. 3 shows a detailed circuit diagram of the switch control section 58. The description of the switch control section 58 follows. Connected between the power source terminal VCC and ground is a series connection of a switch 158 controlled in accordance with the travel of the front shutter curtain and a resistor 160. A junction point between the switch 158 and the resistor 160 is connected to a set terminal S of an R-S flip-flop 164 through an inverter 162. An output terminal Q of the flip-flop 164 is connected to an input terminal D of a first stage D flip-flop 166-1 in a 4-bit shift register 166 formed of four D flip-flops 166-1 to 166-4. A terminal 168 at which the logical level becomes low (L) when the power source to the camera is turned on, is connected to reset terminals R of the D flip-flops 166-1 to 166-4. A clock terminal CLK is connected to clock terminals CK of the D flip-flops 166-1 to 166-4. Output terminals $\overline{Q}$ of the D flip-flops 166-1, 166-2 and 166-3 are respectively connected to the third output terminal 154, one of input terminals of a NAND gate 172 and the second output terminal 72. A second input terminal 68 is connected to the other input terminal of the NAND gate 172 of which the output terminal is connected to a first output terminal 70. An output terminal Q of the D flip-flop 166-4 is connected to one of input terminals of an NAND gate 176 in an electronic flash tuning circuit 174. A first input terminal 60 is connected to the other input terminal of the NAND gate 176 through a series circuit of a delay circuit 178 and an inverter 180. An output terminal of the NAND gate 176 is connected to a base of a PNP transistor 184, through a resistor 182. A collector of the transistor 184 is connected to the power source VCC through a resistor 186, and capacitors 188 and 192. An emitter of the transistor 184 is directly connected to the power source terminal VCC. A junction point between the capacitors 188 and 192 is connected to the power source terminal VC through a resistor 190, and to a gate of a thyristor 194. A cathode of the thyristor 194 is connected to the power source terminal VCC and an anode thereof is connected to an internal terminal of a synchro contact 196 of which the external terminal is connected to the power source terminal VCC.

Figure 4A:
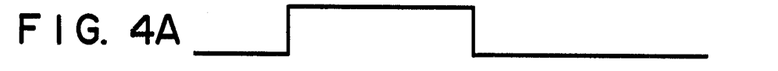
FIGS. 4A to 4D are a timing chart useful in explaining the operation of the switch control section.
Figure 4B:
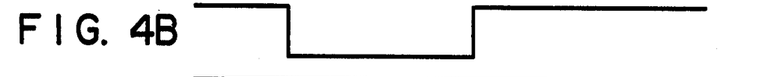
Figure 4C:
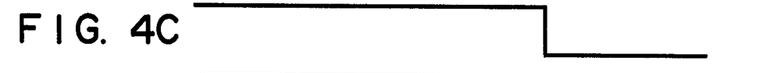
Figure 4D:
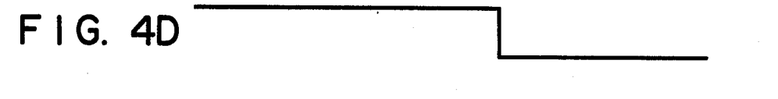

The operation of the switch control section 58 will be described referring to FIGS. 4A to 4D. In FIG. 2, the terminal 46 is set at L (low) level when the front shutter curtain is running and at H (high) level in other cases. Accordingly, the second input terminal 68 of the switch control section 58 is at H level only when the front shutter curtain is running, as shown in FIG. 4A. The first output terminal 70 therefore becomes low in level at an instant that the front shutter curtain starts to run, as shown in FIG. 4B. At the time of the power on of the camera, the D flip-flops 166-1 to 166-4 are reset, so that the second and third output terminals 72 and 154 are initially at H level, as shown in FIGS. 4C and 4D. As the front shutter curtain terminates its running, the terminal 46 (FIG. 2) becomes high in level and therefore the second input terminal 68 changes its level to an L level, as shown in FIG. 4A. As a result, the first output terminal 70 becomes high in level, as shown in FIG. 4B. Simultaneously, upon the termination of the running of the front shutter curtain, the switch 158 is closed and the output terminal of the R-S flip-flop 164 becomes high in level. Subsequently, the data is shifted within the shift register 166 every time the clock pulse is supplied. Thus, after one clock pulse, the third output terminal 154 becomes low in level, as shown in FIG. 4D, and after three clock pulses, the second output terminal 72 becomes low in level, as shown in FIG. 4C. Since the MOS FETs (FIG. 2) are of the N channel type, those is conductive when the gates thereof are at H level. When it is at L level, those are nonconductive. Therefore, by the output signals from the switch control section 58, the NOS FET 20 is nonconductive when the front shutter curtain is running while the MOS FET 34 is conductive. When the running of the front shutter curtain terminates, these states of the FETs are reversed.

Since the first input terminal 60 is connected to the first output terminal of the auto/manual selector 52, the first input terminal 60 is at L level when the rear shutter curtain is at a standstill and become H in level after the rear shutter curtain starts to run. For this reason, an L level signal is applied to the transistor 184 of the electronic flash tuning circuit 174 only after the front shutter curtain running terminates and when the rear shutter curtain is at a standstill, that is to say, when the film surface is fully open, and the synchro contact 196 is conductive.

Figure 5:
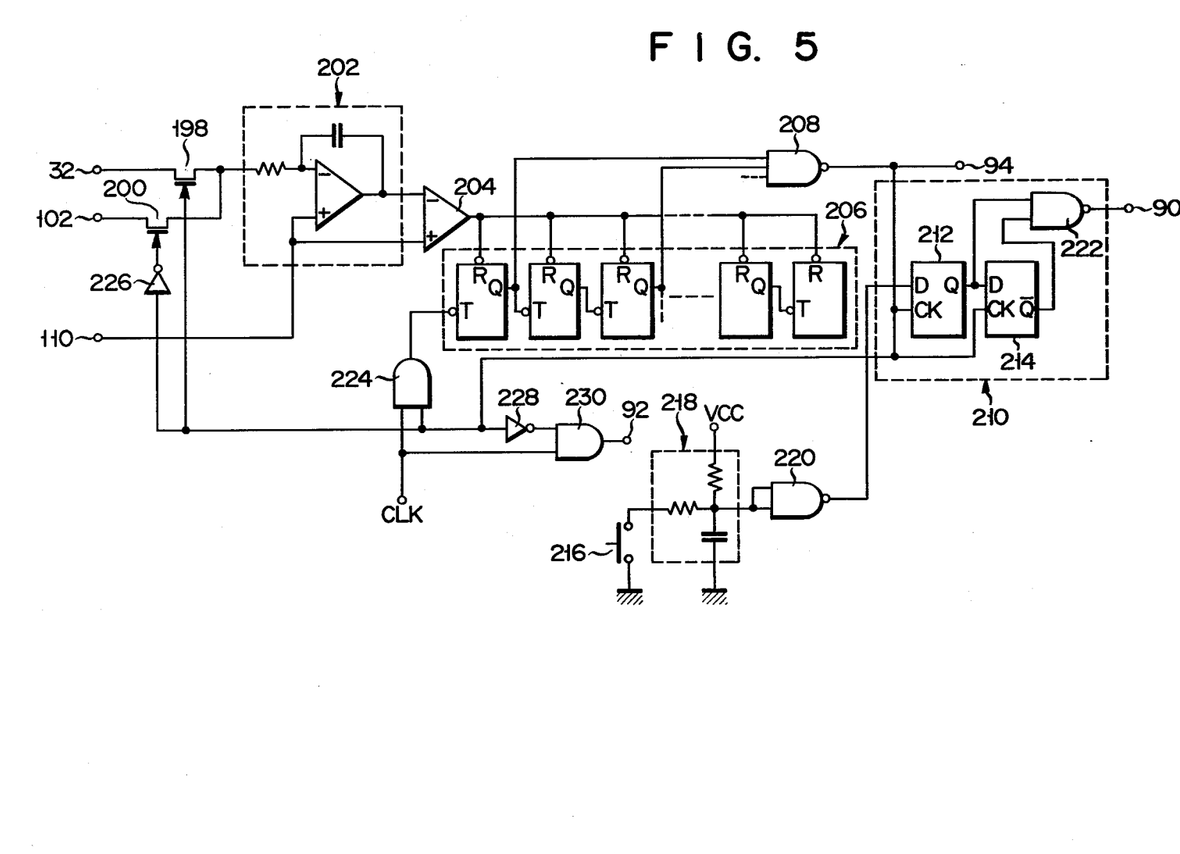
FIG. 5 is a circuit diagram of an A/D converter in the embodiment.

FIG. 5 shows a detailed circuit diagram of the A/D converter 30 in FIG. 2. First and second input terminals 32 and 102 are connected to an inverting input terminal of an integrator 202 repsectively through MOS FETs 198 and 200. An output terminal of the integrator 202 is connected to an inverting input terminal of a comparator 204. A third input terminal 110 of the A/D converter 30 is connected to noninverting input terminals of the integrator 202 and comparator 204. An output terminal of the comparator 204 is connected to a reset terminal R of a binary counter 206 comprised of T flip-flops. Output terminals at given digits of the counter 206 are connected to a NAND gate 208. An output terminal of the NAND gate 208 is connected to the third output terminal 94 and clock terminals CK of D flip-flops 212 and 214 in a synchronizing differential circuit 210. A switch 216 interlocked with a button for the partial metering (not shown) is connected to an input terminal D of the D flip-flop 212 through a series connection of a chattering preventing circuit 218 and an inverter 220. An output terminal $\bar{Q}$ of the D flip-flop 212 connected to an input terminal D of the D flip-flop 214 and one of input terminals of a NAND gate 222. An output terminal $\bar{Q}$ of the D flip-flop 214 is connected to the other input terminal of the NAND gate 222 of which the output terminal is connected to a first output terminal 90. The output terminal of the NAND gate 208 is connected to one of input terminals of an AND gate 224, a gate of the MOS FET 198 and an input terminal of an inverter 226. An output terminal of the inverter 226 is connected to a gate of the MOS FET 200. The output terminal of the NAND gate 208 is also connected to one input terminals of an AND gate 230 through an inverter 228. A clock terminal CLK is connected to the other input terminals of the AND gates 224 and 230. An output terminal of the AND gate 224 is connected to an input terminal T of a first stage T flip-flop in the counter 260 and an output terminal of the AND gate 230 is connected to a second output terminal 92.

Figure 6A:
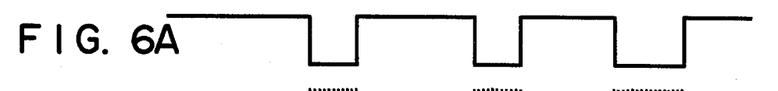
FIGS. 6A to 6E show a timing chart useful in explaining the operation of the A/D converter.
Figure 6B:
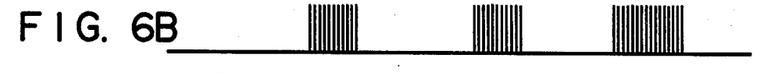
Figure 6C:
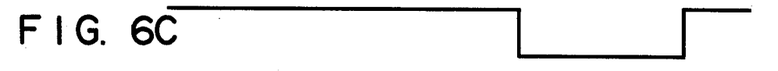
Figure 6D:
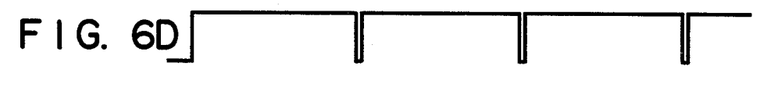
Figure 6E:
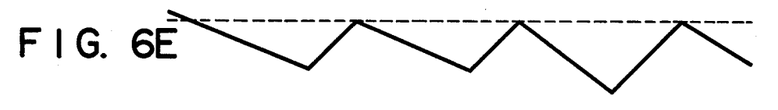

The operation of the A/D converter 30 will be described referring to FIGS. 6A to 6E. Normally, the output terminal of the NAND gate 208, i.e., the third output terminal 94, is set at H level as shown in FIG. 6A. For this reason, the output terminal of the AND gate 230, i.e., the second output terminal 92, is at L level as shown in FIG. 6B. When the partial metering button is not pushed, the switch 216 is open and hence the input signal to the synchronizing differential circuit 210 is at L level and its output terminal, i.e., the first output terminal 90, is at H level as shown in FIG. 6C. Accordingly, the MOS FET 88 is conductive, while the MOS FET 28 is nonconductive. And an output signal of the second photodiode 10 is applied to the A/D converter 30 through the first input terminal 32. Since the third output terminal 94 is at H level, the MOS FET 198 is conductive but the MOS FET 200 is nonconductive. An output signal of the second photodiode 10 is applied to the inverting input terminal of the integrator 202 through the first input terminal 32. Assume now that positive voltages V1 and V2 (V1 less than V2) are applied to the second and third input terminals 102 and 110 of the A/D converter 30 by means of the combination of the power source terminal VR3, the operational amplifier 98 and the resistors 104 and 106, that the voltages V1 and V2 have a temperature coefficient of about 0.3 and lower than the output voltages of the first and second photodiodes 8 and 10. Assume further that the comparator 204 produces an L level signal at the initial stage, as shown in FIG. 6D. By the output signal of the comparator 204, the counter 206 is reset. The integrator 202 integrates a difference signal between the voltage V2 and the output voltage of the second photodiode 10. An output signal from the integrator 202 gradually decreases as shown in FIG. 6E and when it is below a threshold voltage V2 indicated by a broken line, an output signal from the comparator 204 becomes H in level, as shown in FIG. 6D. As a result, the counter 206 is released from its reset state and starts its count operation. When the counter 206 counts a predetermined value, the output terminal of the NAND gate 208, i.e., the third output terminal 94, becomes L in level, as shown in FIG. 6A. As a result, the AND gate 230 conducts and its output terminal, i.e., the second output terminal 92, provides a clock pulse from the clock terminal CLK as it is. The given output terminals Q of the counter 206 are connected to the NAND gate 208 so that the output terminal of the NAND gate 208 is kept at L level after the counter 206 counts the predetermined value. In response to a level change at the output terminal of the NAND gate 208, the MOS FET 200 is in the conductive state and the MOS FET 198 is in the nonconductive state. Accordingly, the integrator 202 integrates a V2-V1 voltage and its output signal increases as shown in FIG. 6E. When the output signal from the integrator 202 reaches V2, the output terminal of the comparator 204 is at L level, as shown in FIG. 6D and the counter 206 is reset. For this reason, the third and second output terminals 94 and 92 are at H and L levels, as respectively shown in FIGS. 6A and 6B. The integrator 202 integrates again the difference between the voltage V2 and the output voltage of the second photodiode 10, so that the output signal of the integrator 202 decreases as shown in FIG. 6E and the output signal from the comparator 204 becomes H in level and the counter 206 starts again its counting operation. Subsequently, a similar operation is repeated. A rate of change in the increase of the output signal from the integrator 202 is fixed, while that in the decrease thereof depends on the output voltage from the second photodiode 10. The output signal from the photodiode 10 is a difference between the real output signal of the second photodiode 10 and the output signal from the variable current source 86. Accordingly, as a brightness of the object is higher, the output voltage is smaller and a rate of change of the decrease is smaller, so that the output voltage of the integrator 202 reaches the voltage V2 for a short period. As a result, a pulse signal inversely proportional to the brightness of the object, i.e., depending on a shutter time, is produced from the second output terminal 92. In this way, the brightness of the object is A/D converted. In the above description, the output signal of the second photodiode 10 is supplied to the A/D converter 30 and therefore a mean metering value before the shutter operation is obtained.

In order to obtain the partial metering value, a camera is set so that the center of the finder is aligned with a portion to be measured and the partial metering button is pushed to close the switch 216. When the switch 216 is closed, the output terminal of the inverter 220 is at H level. When the NAND gate 208 produces an H level signal, the output terminal of the synchronizing differential circuit 210, i.e. the first output terminal 90 of the A/D converter 30, becomes L in level as shown in FIG. 6C. Receiving the next H level pulse, the level at the output terminal 90 returns to H level. The synchronizing differential circuit 210, i.e., the first output terminal 90 of the A/D converter 30, provides negative pulses corresponding to the number of closing of the switch 216, i.e. the number of the partial meterings. When the first output terminal 90 becomes L in level, the MOS FET 28 is conductive and the MOS FET 88 is nonconductive. The output signal from the first photodiode 8 is supplied to the first input terminal 32 of the A/D converter 30. The first diode 8 meters only the center portion before the shutter operation, thereby obtaining the partial metering value.

Figure 7:
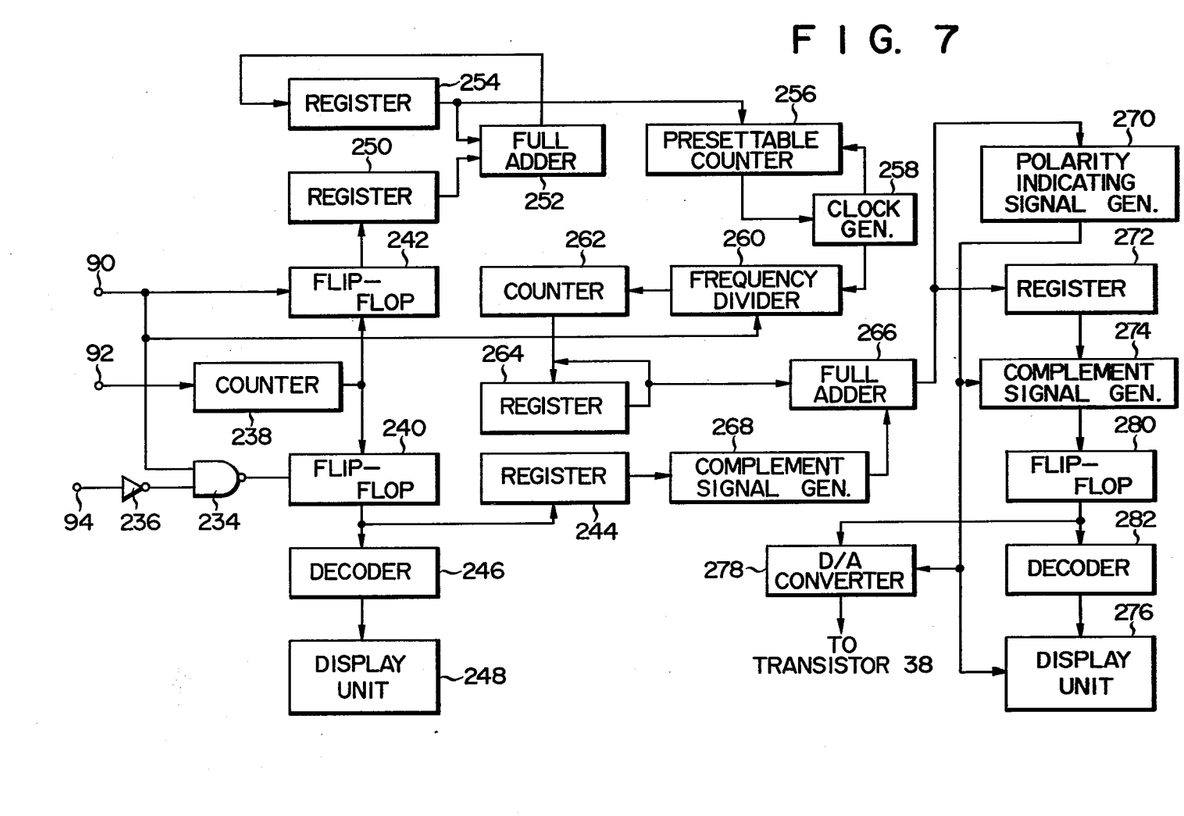
FIG. 7 is a circuit diagram of an arithmetic-display section used in the circuit shown in FIG. 2.

A circuit diagram of the detail of the arithmetic-display section in FIG. 2 will be described referring to FIG. 7. The first output terminal 90 of the A/D converter 30 is connected to one of input terminals of a NAND gate 234 and the third output terminal 94 of the A/D converter 30 is connected to the other input terminal of the NAND gate 234 through an inverter 236. The second output terminal 92 of the A/D converter 30 is connected to a counter 238. An output terminal of the counter 238 is connected to input terminals of D flip-flops 240 and 242. An output terminal of the NAND gate 234 is connected to a clock terminal of the D flip-flop 240. The first output terminal 90 of the A/D converter 30 is connected to a clock terminal of the D flip-flop 242. An output terminal of the D flip-flop 240 is connected to input terminals of a register 244 and decoder 246. An output terminal of the decoder 246 is connected to a display unit 248. An output terminal of the D flip-flop 242 is connected to an input terminal of a register 250. An output terminal of the register 250 is connected to one of input terminals of a full adder 252 of which an output terminal is connected to an input terminal of a register 254. An output terminal of the register 254 is connected to the other input terminal of the full adder 252 and a preset terminal of a presettable counter 256. An output terminal of a clock generator 258 is connected to an input terminal of the presettable counter 256 and an input terminal of a frequency divider 260. An output terminal of the presettable counter 256 is connected to a reset terminal of the clock generator 258. The first output terminal 90 of the A/D converter 30 is connected to a frequency dividing setting terminal of the frequency divider 260. An output terminal of the frequency divider 260 is connected to an input terminal of a counter 262 of which an output terminal is connected to an input terminal of a register 264. An output terminal of the register 264 is connected to its input terminal and to one of input terminals of a full adder 266. An output terminal of the register 244 is connected to an input terminal of a complement signal generator 268 of which an output terminal is connected to the other input terminal of the full adder 266. An output terminal of the full adder 266 is connected to input terminals of a polarity indicating signal generator 270 and a register 272. An output terminal of the polarity indicating signal generator 270 is connected to a complement signal generator 274, a display unit 276, and a D/A converter 278. An output terminal of the register 272 is connected to an input terminal of the complement signal generator 274 which is connected at an output terminal to an input terminal of a D flip-flop 280. An output terminal of the D flip-flop 280 is connected to the display unit 276 through a decoder 282. The output terminal of the D flip-flop 280 is connected also to an input terminal of the D/A converter 278 which is further connected at an output terminal to the base of the transistor 38.

Figure 8A:
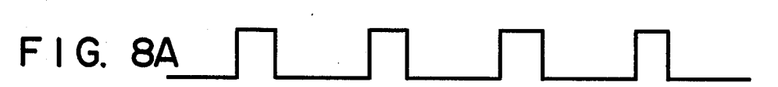
FIGS. 8A to 8C show a timing chart useful in explaining the operation of the arithmetic-display section.
Figure 8B:
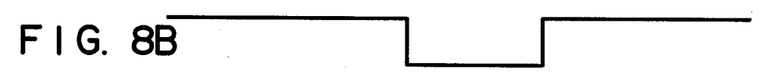
Figure 8C:
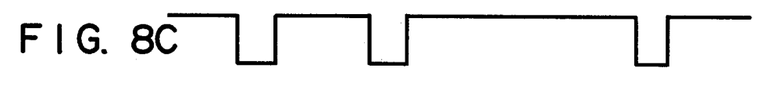

The operation of the arithmetic-display section 96 will be described referring to FIGS. 8A to 8C. Since the third output terminal 94 (FIG. 6A) of the A/D converter 30 is connected to the inverter 236, the inverter 236 produces an L level signal during a period that the integrator 202 in the A/D converter 30 integrates an output signal from the photodiode and produces an H level signal during the other periods. FIG. 8A shows the inverted signal of the signal shown in FIG. 6A but its time scale is different from that in the latter. A level at the first output terminal 90 (FIG. 6C) of the A/D converter 30 is illustrated in FIG. 8B. Accordingly, an output signal from the NAND gate 234 is as shown in FIG. 8C.

A signal from the second output terminal 92 of the A/D converter 30, i.e., a pulse signal representing the result of the A/D conversion, is counted by the counter 238 and the result of the counting is supplied to the flip-flops 240 and 242 where it is stored. In the mean metering mode, that is to say, when the first output terminal 90 (FIG. 8B) of the A/D converter 30 is at H level, the contents of the D flip-flop 240, in response to the leading edge of the output signal (FIG. 8C) from the NAND gate 234, is supplied through the decoder 246 to the display unit 248 where it is displayed, and also supplied to the register 244. In this way, a shutter time before the shutter release is displayed. Since the first output terminal 90 of the A/D converter 30 is kept at H level, the contents of the flip-flop 242 are held unchanged. The contents of the register 244 are supplied to one of the input terminals of the full adder 266 through the complement signal generator 268. The contents of the register 264 supplied to the other input terminal are 0 at this time. Therefore, the output signal from the complement signal generator 268 is generated from the full adder 266 as it is. In the partial metering mode, the first output terminal 90 of the A/D converter 30 provides an L level pulse signal as shown in FIG. 8B (or FIG. 6C) every time the partial metering button is pushed. The D flip-flop 242 responds to the pulse signal to supply its contents to the register 250. At the same time, the pulse signal is applied to the frequency dividing ratio setting terminal of the frequency divider 260 to determine the frequency dividing ratio. At this time, the output signal from the NAND gate 234 is kept at H level, as shown in FIG. 8C. Accordingly, the contents of the flip-flop 240 is not supplied to the decoder 246. The data supplied to the register 250 (the output from the A/D converter 30) is further supplied to the full adder 252. As a result, the data supplied from the A/D converter 30 to the counter 238 is added in the full adder 252 every time the partial metering button is pushed. The result of the addition is set in the presettable counter 256. The presettable counter 256 counts down the output clock signal from the clock signal generator 258. When the value of count is 0, the counter 256 supplies a stop signal to the generator 258 to stop the generation of the clock signal. The frequency divider 260, of which the detail will be described later, has a frequency dividing ratio set in accordance with the number of the partial meterings and frequency-divides the output clock signal from the clock signal generator in accordance with the frequency dividing ratio set. The frequency divided output signal from the frequency divider 260 is supplied to the counter 262. The count of the counter 262 corresponds to a mean value of a plurality of the partial metering values. The count value is supplied to the register 264 and to the full adder 266. The contents of the register 244 is the mean metering value and is supplied to the full adder 266 through the complement signal generator 268. That is, the result of the arithmetic operation in the full adder 266 is the result of the subtraction of the shutter time in the mean metering mode from that in the partial metering mode. This value is supplied to the polarity indicating signal generator 270. The generator 270 produces an H level polarity indicating signal when the input signal is positive and an L level polarity indicating signal when it is negative. The output signal from the full adder 266 is supplied to the register 272. The complement signal generator 274 converts the output from the register 272 into a 2's complement only when the polarity indicating signal is at L level, supplies an absolute value of the output signal of the full adder 266 to the D flip-flop 280, and supplies the output from the register 272 to the D flip-flop 280 as it is when the polarity indicating signal is at H level. In this way, an absolute value of a difference between the partial measuring value and the means metering value is always stored in the D flip-flop 280 and the value stored is applied through the decoder 282 to the display unit 26 where it is visualized. In the mean metering mode, the full adder 266 does not perform the arithmetic operation. Accordingly, the display unit 276 displays nothing at this time.

The output signal from the D flip-flop 280 is converted into an analog signal in the D/A converter 278. When the polarity indicating signal is at L level, that is, when the shutter time in the mean metering mode is longer than that in the partial metering mode, the D/A converter 278 produces a positive signal of which the absolute value corresponds to an absolute value of the output signal from the D flip-flop 280 and produces a negative signal when the polarity indicating signal is at H level.

Figure 9:
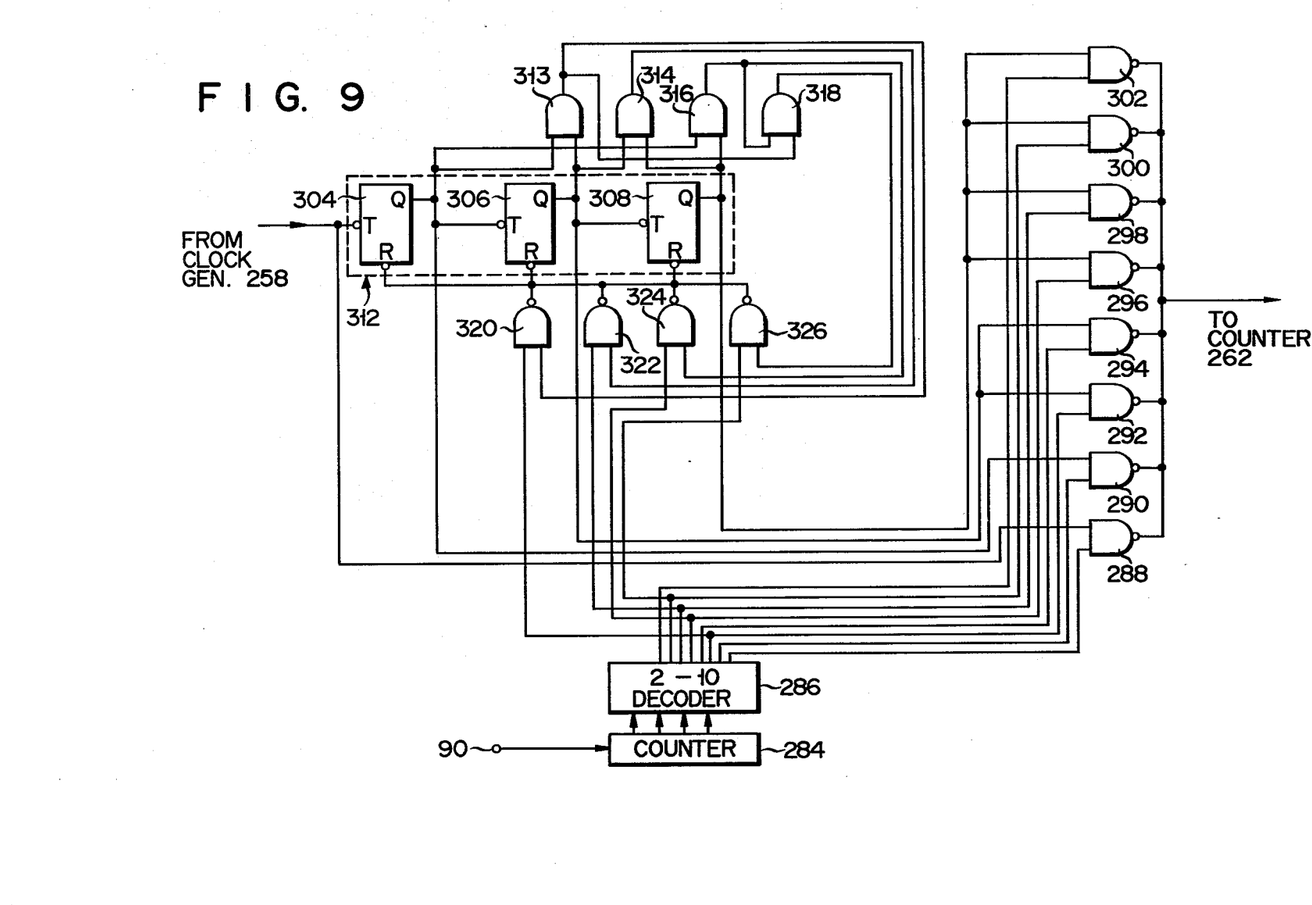
FIG. 9 shows a circuit diagram of a frequency divider in the arithmetic-display section shown in FIG. 7.

Turning now to FIG. 9, there is shown a detailed circuit diagram of the frequency dividing circuit 260 in the arithmetic-display section 96. A first output terminal 90 of the A/D converter 30 is connected to an input terminal of a counter 284 which is further connected at the output terminal to a binary to decimal decoder 286. The decoder 286 has output terminals corresponding to decimal numbers 1 to 8 which are each connected to one of input terminals of each of NAND gates 288, 290, 292, 294, 296, 298, 300 and 302. The output terminal of the smallest number 1 is connected to the NAND gate 288, the output terminal of the succeeding number 2 is connected to the NAND gate 290, . . . , the output terminal of the maximum number 8 is connected to the NAND gate 302. The clock generator 258 is connected to the other input terminal of the NAND gate 288 and a T input terminal of a T flip-flop 304. A T flip-flop 304, together with T flip-flops 306 and 308, makes up a counter 312. An output terminal Q of the T flip-flop 304 is connected to the other input terminal of the NAND gate 290 and one of input terminals of each of AND gates 313 and 316. An output terminal Q of the T flip-flop 306 is connected to the other input terminals of the NAND gates 292 and 294, and an AND gate 313, and one of input terminals of an AND gate 314. An output terminal Q of the T flip-flop 308 is connected to the other input terminals of the NAND gates 296, 298, 300 and 302, and the other input terminals of the AND gates 314 and 316. Output terminals of the AND gates 313 and 316 are connected to an input terminal of an AND gate 318. The output terminals of the AND gates 313, 314, 316 and 318 are connected to one of input terminals of each of NAND gates 320, 322, 324 and 326. The "3", "5", "6" and "7" of the decoder 286 are respectively connected to the other input terminals of the NAND gates 320, 324, 322 and 326. Output terminals of the NAND gates 320, 322, 324 and 326 are connected to the reset terminals R of the T flip-flops 304, 306 and 308. The output terminals of the NAND gates 288, 290, 292, 294, 296, 298, 300 and 302 are connected to the counter 262.

The operation of the frequency divider will be described. A clock signal is counted by the counter 312. A pulse signal corresponding to the number of the partial meterings generated from the first output terminal 90 of the A/D converter 30 is counted by the counter 284 and the number of the meterings is supplied to the decoder 286. The decoder 286 energizes only the output terminal representing the number of the meterings to set its level at H level. The present embodiment allows eight times of the partial meterings. Since the "3", "5","6" and "7" output signals of the decoder 286 are supplied to the reset terminal of the counter 312 through the NAND gates 320, 322, 324 and 326, the NAND gate 320 and the AND gate 313 make up a scale-of-3 counter; the NAND gate 324 and the AND gate 316 make up a scale-of-5 counter; the NAND gate 322 and the AND gate 314 form a scale-of-6 counter; the NAND gate 326 and the AND gate 318 make up a scale-of-7 counter. And the output signal of H level from the decoder 286 resets the counter 312. For example, when the output signal of the decoder 286 is "5", the counter 312 serves as a scale-of-5 counter. As a result, the clock signal is frequency-divided in accordance with the number of the partial meterings. When the output of the decoder 286 is "2", "4" and "8", there is no need of resetting the counter 312.

Figure 10:
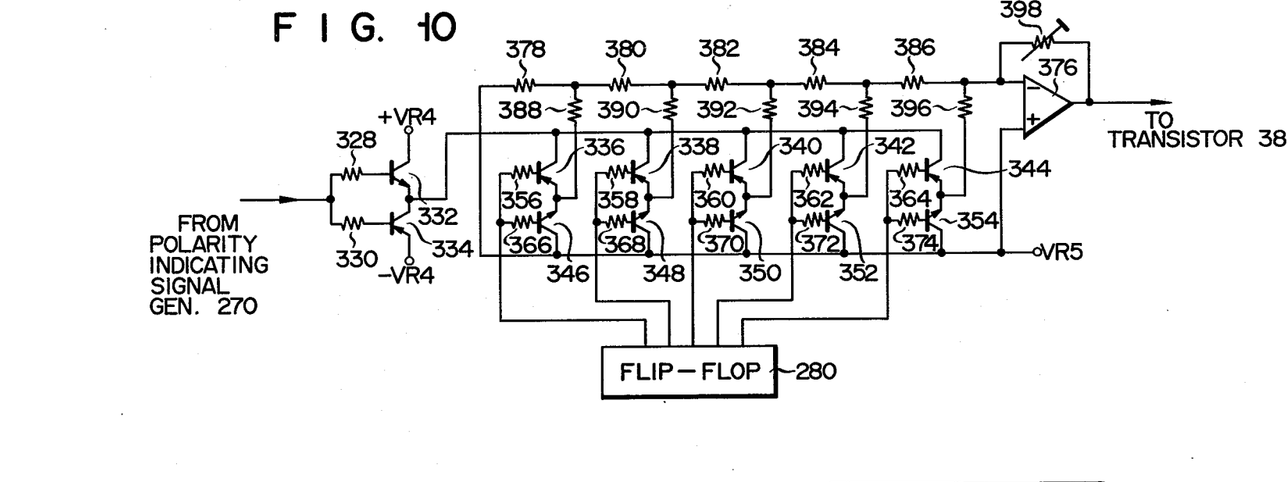
FIG. 10 shows a circuit diagram of a D/A converter in the arithmetic-display section shown in FIG. 7.

In FIG. 10, there is shown a detailed circuit of the D/A converter 278 in the arithmetic-display section 96. The output terminal of the polarity indicating signal generator 270 is connected to the bases of an NPN transistor 332 and a PNP transistor 334 through resistors 328 and 330, respectively. The transistor 332 is connected at a collector to the power source terminal VR4 and at an emitter to a collector of the transistor 334. An emitter of the transistor 334 is connected to the power source terminal −VR4. A connection point between the transistors 332 and 334 is connected to collectors of PNP transistors 336, 338, 340, 342 and 344 of which emitters are connected to emitters of NPN transistors 346, 348, 350, 352 and 354. The output terminals at the respective bits of the D flip-flop 280 are respectively connected to bases of the transistors 336, 338, 340, 342 and 344 through resistors 356, 358, 360, 362 and 364 and to bases of the transistors 346, 348, 350, 352 and 354 through resistors 366, 368, 370, 372 and 374. The output terminal at the least significant bit of the D flip-flop 280 is connected to the transistors 336 and 346, the output terminal at the second bit counted from the least significant bit is connected to the transistors 338 and 348, . . . , the most significant bit terminal is connected to the transistors 344 and 354. The power source terminal VR5 is connected to collectors of the transistors 346, 348, 350, 352 and 354 and a noninverting input terminal of an operational amplifier 376, and to an inverting input terminal of the operational amplifier 376 through a series of the resistors 378, 380, 382, 384 and 386. Emitters of the transistors 336, 338, 340, 342 and 344 are respectively connected to a connection point between the resistors 378 and 380, a connection point between the resistors 380 and 382, a connection point between the resistors 382 and 384, a connection point between the resistors 384 and 386, and the inverting input terminal of the operational amplifier 376, through resistors 388, 390, 392, 394 and 396. An output terminal of the operational amplifier 376 is connected to the base of the transistor 38 and to its inverting input terminal through a variable resistor 398.

The operation of the D/A converter 278 will be described. A reference voltage of the D/A converter 278 is switched between positive and negative polarities in accordance with the output voltage from the polarity indicating signal generator 270. When the input signal is at H level, a positive voltage at the terminal VR4 serves as the reference voltage. Conversely, when it is at L level, a negative voltage at the terminal −VR4 serves as the reference voltage. When the output terminal of the D flip-flop 280 is at H level, the transistors 346, 348, 350, 352 and 354 are conductive. Conversely, when it is at L level, the transistors 336, 338, 340, 342 and 344 are conductive. Let the output signals of the D flip-flop 280 be h0, h1, h2, h3 and h4 as counted from the left end as viewed in the drawing, i.e., the least significant bit. Further, let a resistance of the variable resistor 398 for output adjustment by RV, and let resistances of the ladder resistors 378, 388, 390, 392, 394 and 396 be each 2R. Resistances of the ladder resistors 380, 382, 384 and 386 are assumed to be each R. An output voltage of the D/A converter 278, i.e., an output voltage for the operational amplifier 376, is given by $$V = -P \frac{VR5 \cdot RV}{2R} (2^{-4}h0 + 2^{-3}h1 + 2^{-2}h2 + 2^{-1}h1 + 2h0)$$

where P is +1 when the polarity indicating signal is at H level and is −1 when it is at L level.

Figure 11:
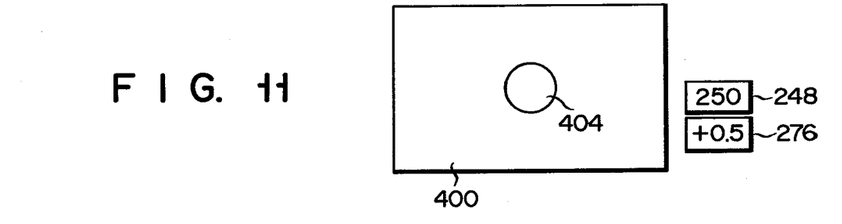
FIG. 11 schematically illustrated display units in a finder.

FIG. 11 shows an arrangement of the display units 248 and 276 in the arithmetic-display section 96. The display unit 248 digitally displays an exposure time in the mean metering mode, and the display unit 276 digitally displays an EV data obtained by subtracting the partial metering value from the mean metering value. Located at the center of a finder 400 is a metering zone for indicating the partial metering range.

Finally, the operation of the automatic exposure control camera of which the circuit diagram is shown in FIG. 2 will be described synthesizing the operations of the respective sections thus far mentioned. A signal level at the terminal 15 is at H level interlocked with the release button and at L level in the remaining state. The timer circuit 60 supplies a signal representing a shutter time manually set by a shutter dial (not shown) as the first output signal to the auto/manual selector 52. The second output signal from the timer circuit 56 is normally at H level and becomes L in level as the front shutter curtain starts to travel. The third output terminal 154 of the switch control section 58 changes its level from H to L after the travel of the front shutter curtain, as shown in FIG. 4D. Therefore, in the initial stage after power on, the MOS FETs 128 and 132 are conductive and nonconductive, respectively. When the front shutter curtain starts to travel, the states of the MOS FETs are inverted. More specifically, before the shutter release, four corrected values (resistances of the resistors 120, 122, 124 and 126) are supplied to the first photodiode 8. After the shutter release, the resistors 120 and 122 for the display adjustment and the aperture information introduction are disconnected from the first photodiode 8. The reason for this is that since the full-aperture metering is conducted before the shutter release, the aperture information must be introduced, while after the shutter release the first photodiode 8 receives the light introduced through the lens and reflected from the film and therefore the metering is conducted under the aperture actually set. Incidentally, the second photodiode 10 receives the light only before the shutter release and hence such switching is not required.

The operation in the mean metering mode will be given. Since the first output terminal 90 (FIG. 6C) of the A/D converter 30 is at H level, only the output signal of the second photodiode 10 is supplied to the first input terminal 32 of the A/D converter 30 where it is subjected to the A/D conversion. A shutter time determined by this signal is displayed by display unit 248. The first terminal 70 (FIG. 4B) and the second output terminal 72 (FIG. 4C) of the switch control section 58 is at H level before the shutter release, so that the MOS FETs 20 and 34 are both in the conductive state. When the mirror rises and the front shutter curtain starts to travel, the first output terminal 70 (FIG. 4B) of the switch control section 58 becomes L in level, so that the MOS FET 20 becomes nonconductive. The first photodiode 8 starts to receive the light reflected from the front shutter curtain after the mirror rises. Accordingly, an intensity of the light reflected from the front shutter curtain immediately before the front shutter curtain travels is stored in the capacitor 36. The data stored is logarithmically compressed by the transistor 16. Since the terminal 46 is at L level during the travel of the front shutter curtain and at the H level in the remaining case, the capacitor 42 is charged by the voltage at the power source VR1 before the travel of the front shutter curtain. In the present embodiment, the voltage at the power source terminal VR1 is lower than that at the power source terminal VR2. Therefore, the output terminal of the comparator 48 is at L level. Accordingly, the transistor 64 is in the conductive state and the rear shutter curtain is held by the magnet 76.

The exposure information stored in the capacitor 36 is logarithmically expanded by the transistor 38. When the front shutter curtain starts to travel and the MOS FET 44 is in the nonconductive state, the charge in the capacitor 42 starts to be discharged. The speed of the discharge depends on the stored information in the capacitor 36. When the voltage across the capacitor 42 is below the voltage of the power source terminal VR2 before the travel of the shutter curtain terminates, the output terminal of the comparator 48 changes its signal level to H level. As a result, the transistor 64 becomes nonconductive and the magnet 76 is deenergized. Therefore, the lock of the rear shutter curtain is released to allow the rear shutter curtain to travel. At this point, the shutter operation is completed.

When the output terminal of the comparator 48 is still at L level even after the travel of the front shutter curtain ends, the so-called direct metering then starts. When the travel of the front shutter curtain ends, the first output terminal 70 (FIG. 4B) of the switch control section 58 becomes H in level and hence the MOS FET 20 becomes conductive. Accordingly, the collector current of the transistor 38 changes in accordance with an intensity of an object even in the course of the metering, whereby the direct metering is carried out. Since a reflectivity of the film is higher than the front shutter curtain, when the front shutter curtain fully opens the film surface, the output current of the first photodiode 8 abruptly increases, thereby failing to perform a collect exposure control. For this reason, the reflectivity of the film must be collected so that the film reflectivity is substantially equal to the reflectivity of the front shutter curtain. When the travel of the front shutter curtain terminates, the third output terminal 154 (FIG. 4D) of the switch control section 58 is at L level. Accordingly, the MOS FET 132 becomes nonconductive, while the MOS FET 140 becomes conductive. As the result, the output terminal of the operational amplifier 130 is coupled with the cathode of the first photodiode 8, so that a potential at the cathode of the first photodiode 8 rises, a gain of the operational amplifier 14 decreases and the collector current of the transistor 38 decreases. In this way, the problem as mentioned above is solved. Incidentally, the film sensitivity information and the like are supplied to the device through the noninverting input terminal of the operational amplifier 130.

For example, when the front shutter curtain is, three grades in terms of the EV data, darker than the film, the potential at the noninverting input terminal of the operational amplifier 14 must be raised by 54 mV {54 mV=about 18 mV (voltage for each EV data)×3} after the travel of the front shutter curtain ends. Therefore, after the travel of the front shutter curtain is completed, an amount of the light received by the first photodiode 8 is increased 8 times that at the end of the mirror rising but the gain of the operational amplifier 14 is decreased to be ⅛. Therefore, the collector current of the transistor 38 is not changed.

The voltages at the power source terminals VR1 and VR2, and the capacitances of the capacitors 36 and 42 are selected that the output signal of the comparator 48 is inverted when the film is properly exposed. The variable resistor 126 is used for adjusting a variation in the brightness on the front shutter curtain of each camera. The variable resistor 126 may be connected to the base of the transistor 38. In this case, the base potential is decreased after the front shutter curtain is fully opened. In the present embodiment, however, such connection is not employed because of making use of the base potential of the transistor 38 in the partial metering mode.

The operation of camera in the partial metering mode follows. As mentioned above, the partial metering is performed, by means of the first photodiode 8, with the camera being directed toward a desired portion on an object before the shutter release. Under this condition, a difference between a mean metering value by the second diode 10 and the partial metering value (in the case of a plurality of the metering values, a mean value of them) is supplied from the arithmetic-display section 96 is supplied to the base of the transistor 38. The difference signal is a positive signal when the shutter time in the partial metering mode is longer than that in the mean metering mode, but it is a negative signal when the former is shorter than the latter. And the shutter operation is carried out as in the case of the mean metering mode. When the shutter time of the partial metering is longer, the base potential of the transistor 38 rises and therefore the speed of the discharge from the capacitor 42 is slow and the shutter time is longer than that of the mean metering mode. At this time, the output signal from the first photodiode 8 receiving the reflective light from the film during the shutter operation is supplied to the emitter of the transistor 38. Therefore, the camera can cope with a change in the incident light during the shutter operation.

In this way, the partial metering by the direct metering can be carried out in a manner that the difference between the mean metering value and the partial metering value is previously obtained before the shutter operation and the difference is added to a value obtained by actually mean-metering the incident light in the shutter operation. Therefore, the mean value of the partial meterings at a plurality of the portions can be obtained in the direct metering mode. Further, since the exposure arithmetic section is commonly used for each metering, the switch between the partial metering and the mean metering can be realized with the simple construction.

In the modification of the above-mentioned embodiment, the collect signal supplied to the base of the transistor 38 in order to estimate a partial metering value in the direct metering mode may be supplied to the noninverting input terminal of the operational amplifier 14 for the direct metering. In this case, a polarity of the collect signal is opposite to that in the previous case. In the camera in which a range of the direct metering covers a part of the film surface, not an entire film surface, the mean metering value may be estimated by adding the collect value to the partial metering value. As seen from the above description, in the present invention, the metering range can be switched in the direct metering by adding a difference between exposure values when the metering ranges are different from each other which is obtained during the course of storage metering.

What we claim is:

1. An automatic exposure control camera comprising:
    light receiving means having first and second photoelectric converting elements which are both in a light receiving state before the shutter release but only of which is in the light receiving state during the shutter release;
    first operating means coupled with said first and second photoelectric converting elements for producing a difference signal output which corresponds to the difference between output signals of said first and second photoelectric converting elements before the shutter release;
    second operating means for producing a sum signal of an output signal from said photoelectric converting element rendered in the light receiving state during the shutter release and said output signal from said first operating means; and
    means coupled to said second operating means for controlling an exposure of a camera in accordance with one of an output signal from said second operating means and an output signal from said photoelectric converting element rendered in the light receiving state during the shutter release.

2. An automatic exposure control camera according to claim 1, in which said light receiving means includes:
    said first photoelectric converting element which is arranged for receiving the light reflected from a front shutter curtain provided at the bottom of the camera and a film and covering an entire surface of a frame;
    said second photoelectric converting element which is provided in a finder section of the camera and having the same light receiving range as said first photoelectric converting element; and
    a mirror means including a main mirror of which the central portion is translucent with a submirror mounted behind the translucent portion, whereby before the shutter release, said mirror means guides the light from the central portion of the frame to said first photoelectric converting element through said submirror and guides the light from the entire frame to said second photoelectric converting element by the reflecting light from said mirror means itself, and during the shutter release said mirror means exposes the front shutter curtain and film but light-shields said second photoelectric converting element.

3. An automatic exposure control camera according to claim 2, in which said first operating means includes means for producing a mean value signal of output signals from said first photoelectric converting element and an output signal from said second photoelectric converting element before the shutter release.

4. An automatic exposure control camera according to claim 3, in which said first operating means includes an analog to digital converter for converting the output signal from said first photoelectric converting element into a pulse signal, and a frequency divider for frequency-dividing an output signal from said analog to digital converter.

5. An automatic exposure control camera according to claim 1, further comprising means for displaying, within a finder of the camera, an output signal from said photoelectric converting element rendered in the light receiving state during the shutter release and the output signal from said second operating means.

* * * * *

UNITED STATES PATENT AND TRADEMARK OFFICE
CERTIFICATE OF CORRECTION

PATENT NO. : 4,432,623
DATED : February 21, 1984
INVENTOR(S) : Masafumi YAMASAKI and Muneaki YOSHIDA It is certified that error appears in the above-identified patent and that said Letters Patent is hereby corrected as shown below:

Column 1, line 7, "the TTL type camera" should read
--TTL type cameras--;

line 35, before "direct", delete "the";
line 56, after "release", change "," to --;--;
line 58, after "rendered", insert --in--;
line 60, after "circuit", insert -- ; --;
line 63, after "rendered", insert --in--;

Column 6, line 6, change "repsectively" to --,respectively,--;

Column 11, line 37, change "of resetting" to --to reset--;

Column 12, line 49, after "2", insert -- , --;

Column 15, line 37, after "only", insert --one--.

Signed and Sealed this

Thirty-first Day of July 1984

[SEAL]

Attest:

GERALD J. MOSSINGHOFF

*Attesting Officer*   *Commissioner of Patents and Trademarks*